United States Patent [19]
Falborg

[11] 3,777,331
[45] Dec. 11, 1973

[54] APPARATUS TO BE USED IN CONNECTION WITH THE FILLING OF TUBULAR FILMS, SO CALLED SYNTHETIC CASINGS

[75] Inventor: Helge Jorgen Falborg, Aabybro, Denmark

[73] Assignee: Maskinfabriken Hefa, Aabybro A/S, Aabybro, Denmark

[22] Filed: Mar. 26, 1971

[21] Appl. No.: 128,288

[30] Foreign Application Priority Data
Mar. 31, 1970 Denmark .................................. 1614

[52] U.S. Cl. ...................... 17/32, 17/38, 53/124 E, 100/DIG. 10, 141/314
[51] Int. Cl. ..... A22c 11/04, B65b 3/12, B65d 55/02
[58] Field of Search ................ 17/38, 39; 53/124 E, 53/124 TS; 141/313, 314; 100/DIG. 10

[56] References Cited
UNITED STATES PATENTS

| | | | |
|---|---|---|---|
| 3,727,546 | 4/1973 | McKinney | 53/124 TS |
| 3,593,484 | 7/1971 | Dussich | 53/124 E |
| 3,462,793 | 8/1969 | Sumption | 141/313 X |
| 3,140,735 | 7/1964 | Windle | 141/314 X |
| 3,480,449 | 11/1969 | Sumption | 141/313 X |
| 2,703,671 | 3/1955 | Kindseth | 141/314 X |
| 2,847,805 | 8/1958 | Robbins | 53/123 E |
| 2,977,732 | 4/1961 | Leonard | 53/124 E |
| 3,283,361 | 11/1966 | Sommer | 17/38 |

*Primary Examiner*—Wayne A. Morse, Jr.
*Attorney*—Edward F. Levy

[57] ABSTRACT

A continuous length of tubular synthetic casing is filled with successive charges of sausage meat or other food product by transporting the free end of the casing by means of a conveyor onto a filling tube from which the food charges are extruded, clamping the casing end on the filling tube, retracting the conveyor to its starting position, extruding the charge of food into the casing, and tying off and cutting the ends of the filled casing. The food charge is inserted into the casing with flat end pieces at each end thereof, and the casing is tied or clamped to the end pieces providing the finished product with ends of uniform diameter for slicing.

10 Claims, 3 Drawing Figures

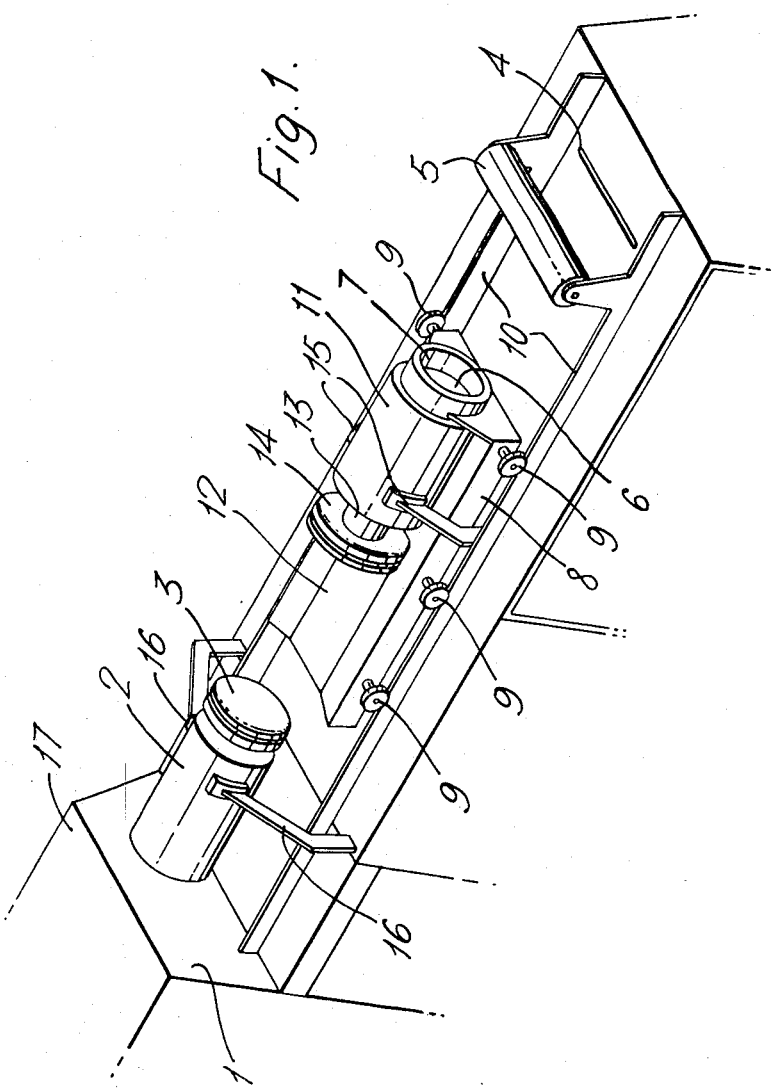

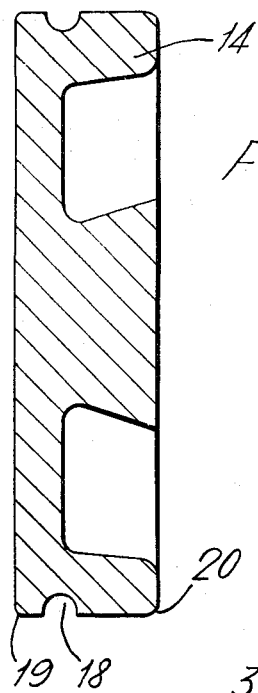
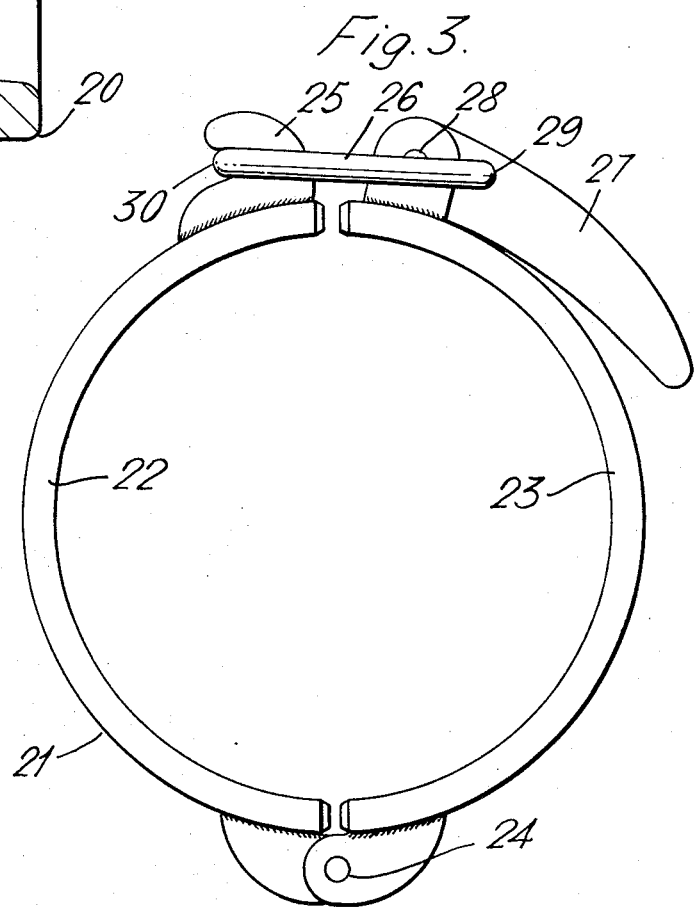

APPARATUS TO BE USED IN CONNECTION WITH THE FILLING OF TUBULAR FILMS, SO CALLED SYNTHETIC CASINGS

The present invention relates to an improved method for the filling of synthetic tubular casings of the type used in making sausages, and to novel apparatus employed in following such method.

An object of the invention is the provision of a method and apparatus of the aforementioned type which permits automatic filling of synthetic casings and subsequent tying of the ends thereof in a easy and convenient manner, and preferably in such a fashion that the finished sausages or other moldings may be cut into slices or pieces avoiding waste at the ends of the sausage which is normally encountered because of the tapered and uneven shapes of the ends of conventionally-filled and tied sausages.

In accordance with the invention, the method and the associated apparatus contemplates the carrying of the synthetic casing by means of a gripping, holding and conveyor assembly up to and onto a filling sleeve of a press from which sausage meat or other food substance is extruded. When the casing reaches the filling sleeve, it is clamped thereon by other gripping means, whereupon the conveyor assembly is returned to its starting position in preparation for a successive filling sequence in which it will carry an additional length of synthetic casing to the filling sleeve. The food substance is extruded through the filling sleeve into the synthetic casing clamped thereon, preferably simultaneously with the return movement of the conveyor assembly to its starting position. When the length of casing is filled with the food substance, the molded sausage or other products is tied at its ends and the casing is cut off outside the ties. The completed sausage is then removed from the apparatus and the cycle is repeated with a further length of the casing.

The method of the present invention is particularly adapted for the filling of tubular casings with meat products compressed by a sausage or ham press of the type shown in U.S. Pat. No. 3,524,297 issued Aug. 18, 1970, the compressed food being extruded therefrom through a filling sleeve and preferably bordered by end pieces which are inserted in the chamber of the press before the food is compressed.

Another object of the invention is the provision of a method and apparatus of the character described which provides for reliable and rapid mechanical filling of tubular casings and renders possible the gentle handling of the thin casings without delaying or complicating the filling operation.

Another object of the invention is the provision of a method and apparatus of the character described in which the food product is filled within the tubular casing with rigid end pieces at both ends thereof, which end pieces insure that the ends of the sausage, compressed luncheon meat, or similar food product are uniform in diameter and shape, thus facilitating the cutting of the finished product without waste, the end pieces also being preferably arranged to enable the casing to be tied therearound or clamped thereto by rapid closing toggle clamps. The use of the end pieces for tying the ends of the product results in rapidly produced and particularly reliable and precise ties. Not only do the end pieces avoid waste in the cutting of the end slices of the product, but they minimize waste of the casing utilized since the casing can be cut flush with the flat end surfaces of the end pieces.

Additional objects and advantages of the invention will become apparent during the course of the following specification when taken in connection with the accompanying drawings, in which:

FIG. 1 is a perspective view of apparatus for the filling of tubular casings made in accordance with the invention;

FIG. 2 is an enlarged section taken through the diameter of one of the end pieces shown in FIG. 1; and FIG. 3 is an enlarged elevational view of a tying or clamping device used for closing off the ends of the finished sausage or other product made in accordance with the invention.

Referring in detail to the drawings, there is shown in FIG. 1 a press 1 for sausage meat, hams or other meats or foods, of the type illustrated and described in my U.S. Pat. No. 3,524,297, issued Aug. 18, 1970, the specific details and operation of which are incorporated by reference herein. Hams, sausage meat and similar food products are compressed within the press 1 and are discharged through a tubular filling sleeve 2. FIG. 1 also illustrates an end piece 3, made in accordance with the present invention, in a position in which it is emerging from the front orifice of the filling sleeve 2. This end piece 3 would be in engagement with the rear end of the compressed food substance emitted from the filling sleeve, in accordance with the method of the invention as will be presently described, and would be pushed forward to the position shown by the food substance extruded from the press 1.

Forwardly of the filling sleeve 2 is a table or enclosure in which a transverse slot 4 is provided for passage of a synthetic casing drawn from a supply roll (not shown) mounted within the table. After passage through the slot 4, the casing is guided over a horizontal roller 5 and then fed through the aperture 6 of a ring or tube 7 fixedly mounted on a conveyor in the form of a carriage 8. The carriage 8 is provided with wheels 9 which roll upon a pair of rails 10 affixed to the table surface.

After passing through the aperture 6 of ring 7, the tubular casing is pulled over a cylindrical block 11 whih is preferably made of a polyamid plastic. The block 11 normally rests upon or seats within a trough-like longitudinal depression or slot 12 in the carriage 8, and at its end facing sleeve 2, it is provided with a projecting stud 13 of a diameter smaller than that of the cylindrical block 11.

Also resting in the slot 12, and abutting the stud 13, is a front end piece 14 which is identical to the rear end piece 3. The end piece 14 is sized to fit within the tubular casing, and is constructed to permit the tubular casing to be secured to the periphery of the end piece 14 by fastening means in a manner to be presently described. When the end piece 14 is so secured within the tubular casing, during the filling operation of the casing the end piece 14 is pushed with the casing in a direction away from the press 1.

A set of gripping members 15 are pivotally mounted on the carriage 8 and adapted to be brought to a gripping position in which they press against and hold the block 11, with the synthetic tubular casing between the block and the gripping members.

A second set of gripping members 16 are also movably mounted on the table on either side of the filling sleeve 2, and when brought to the gripping position shown in FIG. 1, they abut and press against the end of the tubular casing which has been drawn upon the filling sleeve, thus locking the end of the tubular casing around said filling sleeve 2.

The carriage 8 is adapted to be moved along rials 10 by a pneumatic or hydraulic prime mover of conventional type (not shown) in its forward and return movements, and automatic means may also be provided to operate the gripping members 15 and 16 at the proper times in synchronization with such movement. On the other hand, the carriage may be designed to roll freely in its return movement under only the force of the meat product and end members extruded from the filling tube, in which case a simplification of the control of the power transmission is achieved.

When the apparatus is to be used for filling the tubular casing with a food product, the lid 17 of the press 1 is opened and ham, sausage or other food substance is loaded into the compression chamber of the press. At the same time, the end pieces 3 and 14 are inserted at the respective ends of the compression chamber so that they bracket the charge of food therein. Alternatively, only the rear end piece 3 may be loaded in the chamber, and the front end piece 14 may be subsequently inserted within the tubular casing before the food product is extruded therein.

The synthetic casing is now drawn from the supply roll through the slot 4 and through the aperture 6 of ring 7, and is then inserted over block 11 so that the block is entirely contained within the casing and the end of the latter projects beyond the end of block 11 which faces away from ring 7. The block 11 is moved forwardly into contact with the ring 7, and the gripping members 15 are closed to hold the block in this position. If the front end piece 14 has not been loaded in the press 1, it may be inserted in the end of the tubular casing at this time.

The carriage 8, together with the gripping members 15, follower ring 7, and block 11, is now rolled rearwardly toward the press 1, thus carrying the synthetic casing along with it, until the free end of the synthetic casing projecting beyond block 11 has been carried up to and on to the filling sleeve 2 for such a distance that the casing can be grasped by the gripping members 16. The latter are now closed to lock the end portion of the synthetic casing around the filling sleeve 2.

The gripping members 15 are now opened to release the block 11 from the tubular casing, and the carriage 8 with ring 7 is rolled forwardly until it has returned to its original position. The released block 11, however, is left within the tubular casing in a position touching or close to the filling sleeve 2.

During this initial period, the sausage or other food product has been compressed within the press 1 into an elongated form in which it will fit into the tubular synthetic casing. As the carriage 8 begins its return forward movement, the compressed food is extruded through the filling sleeve 2 and into the end of the tubular casing which surrounds it. If the front end piece 14 has been initially loaded into the press 1, it is expelled from the filling sleeve 2 in advance of the compressed food product. If the end piece 14 has been initially inserted in the synthetic casing, as previously described, the extruded food substance engages the end piece 14 inside the tubular casing. The advancing food substance thus pushes the end piece 14 toward the projecting stud 13 on block 11, and after the stud 13 is contacted, the block 11 is pushed forwardly through the tubular casing until it engages the ring 7 on carriage 8. It will be appreciated that as the block 11 moves away from the end of the tubular casing which is locked on the filling sleeve 2, it expands the casing to its circular form, permitting the compressed food substance to follow freely through the casing. The block also provides a reliable connection between the elements working inside and outside the synthetic casing, without causing damage to the casing.

When the rear end piece 3 emerges from the filling sleeve 2, as shown in FIG. 1, the forward return movement of carriage 8 is stopped. A length of the tubular casing is now supported between the filling sleeve 2 and the block 11 on carriage 8, filled with the meat substance with the end pieces 3 and 14 at each end thereof. The casing is tied or otherwise secured to the end pieces and is cut off along the outer surfaces of the end pieces to complete the filled sausage or other product, which is removed from the trough 12.

The apparatus is now in condition for succeeding filling operations in which further lengths of synthetic casing are carried to the filling sleeve in which the same process as previously described is followed.

The end pieces 3 and 14 are of identical construction, and both may be formed as shown in FIG. 2, with a groove 18 for tying the casing thereto, as well as chamfers or rounded corners 19 and 20.

Each end piece 3 and 14 is preferably thin and flat, as shown in the drawings, having planar front and rear faces. It will thus be appreciated that when the food substance is extruded, the bordering end pieces insure that the front and rear ends of the extruded charge are flat and planar. Thus, the filled length of tubular casing and food substance therein has a uniform diameter from one end to the other. When the finished product is then spliced, each of the slices will be of identical size and there will be no waste pieces at the ends, as is normally encountered in slicing sausages or other products which have tapered or uneven ends. In addition, the tying of the ends of the casing around the end pieces permits the casing to be cut off flush with the outer flat faces of the end pieces, thereby eliminating waste of the casing during manufacture of the product. It is also possible to use extremely thin flat end pieces, achieving even less waste of the casing.

The ring 7 serves as a follower member and is provided with an internal diameter which is somewhat smaller than the diameter of block 11 so that it supports the block with the synthetic casing clasped between the ring and the block. When the gripping members 15 are closed upon the casing enclosing block 11, the ring 7 assists the gripping members in holding the block which otherwise would be held by frictional force exerted by the gripping members alone.

The ring 7 may be provided with chamfered or rounded internal edges at least at the end thereof facing block 11 in order to avoid damaging the synthetic casing during the time it is transported to the filling sleeve 2.

To further protect the synthetic casing from being stretched and possibly torn, the apparatus is preferably so designed that the carriage 8 begins its return movement before the extruded food product has advanced to such a point that the front end piece 14 contacts block 11.

Since the sausage or compressed food substance is normally not very rigid, the trough 12 on the surface of carriage 8 is designed to serve as a supporting bed for that portion of the casing which is filled with the extruded food substance during the return stroke, and for supporting and controlling the block 11.

The filling sleeve 2 is preferably tapered in the direction of the extrusion to aid in receiving the end of the tubular casing carried to it by block 11, and may also be longitudinally slotted to provide seats for the gripping members 16. This avoids the risk of damage to the tubular casing as the latter is transferred from block 11 to filling tube 2, at the same time insuring that the gripping members will firmly grip the received end of the casing. The casing may thus be securely transferred to the filling sleeve without the application of considerable force upon the casing.

During the return movement, the carriage serves as a support for the front end piece 14 which is pushed forwardly by the extruded food substance, and at the end of the return movement, the block 11, stud 13 and ring 7 act as a buffer for the end piece 14.

In order to secure the synthetic casing quickly and easily to the end pieces 3 and 14, a toggle closure member 21 of the type illustrated in FIG. 3 may be employed. The member 21 comprises a pair of semicircular pieces 22 and 23 having facing inner surfaces which are preferably of a size and shape corresponding to the groove 18 in the end pieces. The pieces 22 and 23 are pivotably connected together at one end by a hinge 24.

The closure member 21 can be brought to the closed position shown in FIG. 3, and locked in this position, by means of a toggle closure assembly comprising a hook 25 secured to piece 22, a loop or link 26 adapted to grasp the hook 25, and a lever 27 pivotally mounted or hinged at 28 to the piece 23, and having an aperture 29 in which the loop 26 is mounted.

The closure member 21 is so designed that as the lever 27 is initially lowered to to the position shown in FIG. 3, it applies force at point 29 to draw loop 26 toward it, which point 29 is closer to the center of the closure than the point 30 at which the loop 26 engages hook 25. Thus the semicircular pieces 22 and 23 are drawn firmly together and locked under an efficient toggle action. In addition, the loop 26, or other parts of the closure member, may be made of a relatively flexible material so that the member may be closed beyond its dead center point against an elastic force without damaging the closure member or the end piece to which it is fastened, and so that the elasticity will enhance the gripping effect after the member is closed.

What is claimed is:

1. Apparatus for filling a continuous length of synthetic tubular casing with a food product extruded from a filling sleeve, comprising means for feeding a continuous length of tubular casing from a location remote from said filling sleeve, conveyor means movable toward and away from said filling sleeve between a first position adjacent said feeding means and a second position adjacent said filling sleeve, a block sized to fit snugly within the end portion of said tubular casing and adapted to be supported by said conveyor means, and first releasable gripping means for clamping said tubular casing to the block therewithin, and holding said block rigidly on said conveyor means as the latter is moving toward said filling sleeve from said first position to said second position, said conveyor means being arranged to move toward said filling sleeve to said second position in which the end portion of said tubular casing projecting from said block is received upon and around said filling sleeve, said apparatus also including second releasable gripping means for clamping said end portion of the casing to said filling sleeve, and means for opening said first clamping means to release said block for return movement of said conveyor means to its first position.

2. Apparatus according to claim 1 which also includes a follower member mounted on said conveyor means and having an aperture through which said tubular casing is threaded, said follower member being positioned to engage and support said block with a portion of the tubular casing disposed between said block and said carrier member.

3. Apparatus according to claim 2 in which said follower member is a ring having an internal diameter smaller than the diameter of said block, said ring having rounded internal edges at the end facing the block.

4. Apparatus according to claim 1 which also includes a pair of flat end pieces bordering the ends of said food product as the latter is extruded into said tubular casing.

5. Apparatus according to claim 4 in which said conveyor means is adapted to commence its return movement before the food product extruded from the filling sleeve has advanced to a point in which the foremost end piece engages said block.

6. Apparatus according to claim 1 in which said conveyor means includes a carriage and rails supporting and guiding said carriage.

7. Apparatus according to claim 6 in which said conveyor means also includes drive means for said carriage, comprising an automatic prime mover for driving said carriage in both directions.

8. Apparatus according to claim 6 in which said carriage is adapted to move in its return movement toward its first position only under the force applied to said follower member by the block driven through the tubular casing by the extruded food product.

9. Apparatus according to claim 6 in which the carriage is provided with a surface shaped to provide a support bed for the portion of the casing filled with the extruded food product and said block during the return movement of said carriage.

10. Apparatus according to claim 1 in which said filling sleeve is longitudinally slotted and tapered in the direction of the extrusion.

* * * * *